US005473738A

United States Patent [19]
Hamlin et al.

[11] Patent Number: 5,473,738
[45] Date of Patent: Dec. 5, 1995

[54] INTERACTIVE COLOR HARMONIZING METHODS AND SYSTEMS

[76] Inventors: Jay F. Hamlin, 1825 42nd Ave., Capitola, Calif. 95010; Scott Sandow, 2516 Carlene La., Santa Cruz, Calif. 95062; Robin Sandow, 20164 Charest St., Detroit, Mich. 48234

[21] Appl. No.: 302,098

[22] Filed: Sep. 7, 1994

Related U.S. Application Data

[63] Continuation of Ser. No. 59,068, May 10, 1993, abandoned.
[51] Int. Cl.⁶ .................................................. G06T 11/00
[52] U.S. Cl. ......................... 395/131; 395/155; 395/161
[58] Field of Search .................................. 395/118, 126, 395/129–132, 155–157, 161; 364/526; 358/500–502, 505, 518–521

[56] References Cited

U.S. PATENT DOCUMENTS

| | | | |
|---|---|---|---|
| 3,836,246 | 9/1974 | Bowker | 355/32 |
| 4,110,826 | 8/1978 | Mollgaard et al. | 364/526 |
| 4,613,947 | 9/1986 | Suzuka et al. | 364/526 |
| 4,652,136 | 3/1987 | Harjunmaa | 356/408 |
| 4,813,000 | 3/1989 | Wyman et al. | 364/526 |
| 4,884,221 | 11/1989 | Sugiyama et al. | 364/526 |
| 4,954,972 | 9/1990 | Sullivan | 364/526 |
| 5,103,407 | 4/1992 | Gabor | 395/131 |

OTHER PUBLICATIONS

"Computer Graphics Principles and Practice" Foley et al. (1990) pp. 563–603.
Kuern, "Real World Freehand 3" 1991 pp. 24–27, 50, 51, 100, 101, 287–335.

*Primary Examiner*—Almis R. Jankus
*Attorney, Agent, or Firm*—Laurence R. Brown

[57] ABSTRACT

A substantially universal range of color standards over the visible spectrum is displayed for visual observation, comparison with extraneous colors and for interactive color processing in a color computer processing system. In the comprehensive set, standardized colors are defined by hue supplemented by black and white content related in a visual format. Thus, a set of discrete hue values across the visible spectrum, typically 24, is displayed in a circular array for selections of hue. Each selected hue is displayed together with a range of colors obtained by combining black and white content to produce a set of colors associated with that hue. Thus a very large number of colors may be viewed for visual effect and comparison with extraneous colors to make selections of color sets, harmonized color combinations, or the like. Any of the colors are available for interactive color processing, such as editing, graphical development or identification of colors and color relationships, either singly or in sets. Colors in objects such as paints, draperies, paintings, dresses, etc. thus could be closely identified and standardized for faithful reproduction, editing or other interactive color processing procedures such as harmonizing with related color schemes.

23 Claims, 12 Drawing Sheets

Ostwald Notation

| | %W | %B |
|---|---|---|
| a | 100.0 | 0.0 |
| b | 78.6 | 21.4 |
| c | 61.6 | 38.4 |
| d | 48.0 | 52.0 |
| e | 37.3 | 62.7 |
| f | 28.8 | 71.2 |
| g | 22.0 | 78.0 |
| h | 16.6 | 83.4 |
| i | 12.4 | 87.6 |
| k | 9.0 | 91.0 |
| l | 6.3 | 93.7 |
| m | 4.1 | 95.9 |
| n | 2.4 | 97.6 |
| o | 1.1 | 98.9 |
| p | 0.0 | 100.0 |

FIG. IE
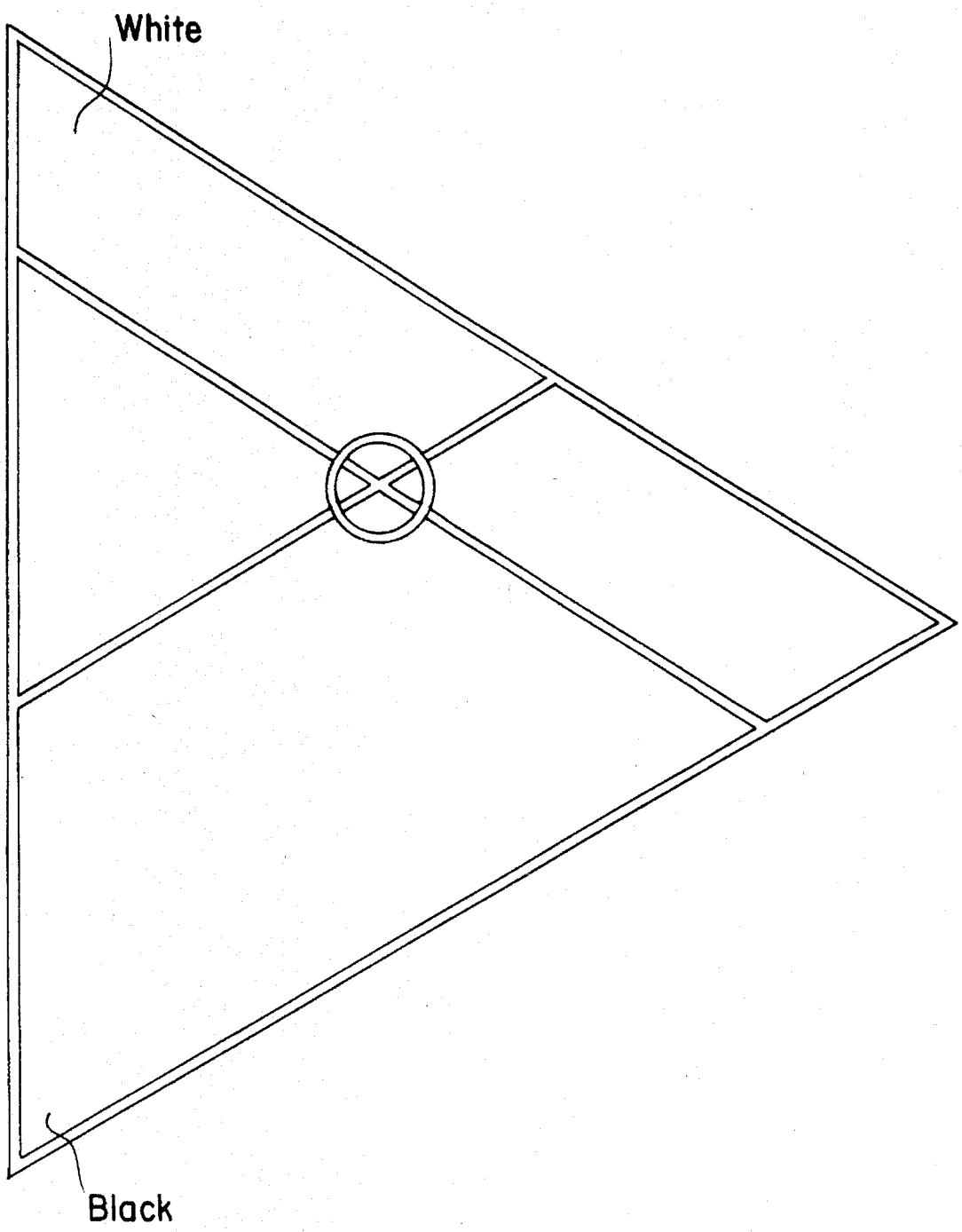

Hue Equivalences

| Color | Ostwald 1-24 | Computer Graphics 0-360 | Macintosh 0-65535 |
|---|---|---|---|
| Yellow | 1 | 60 | 10,922 |
| Green | 5 | 120 | 21,845 |
| Cyan | 9 | 180 | 32,767 |
| Blue | 13 | 240 | 43,690 |
| Magenta | 17 | 300 | 54,613 |
| Red | 21 | 0 | 0 |

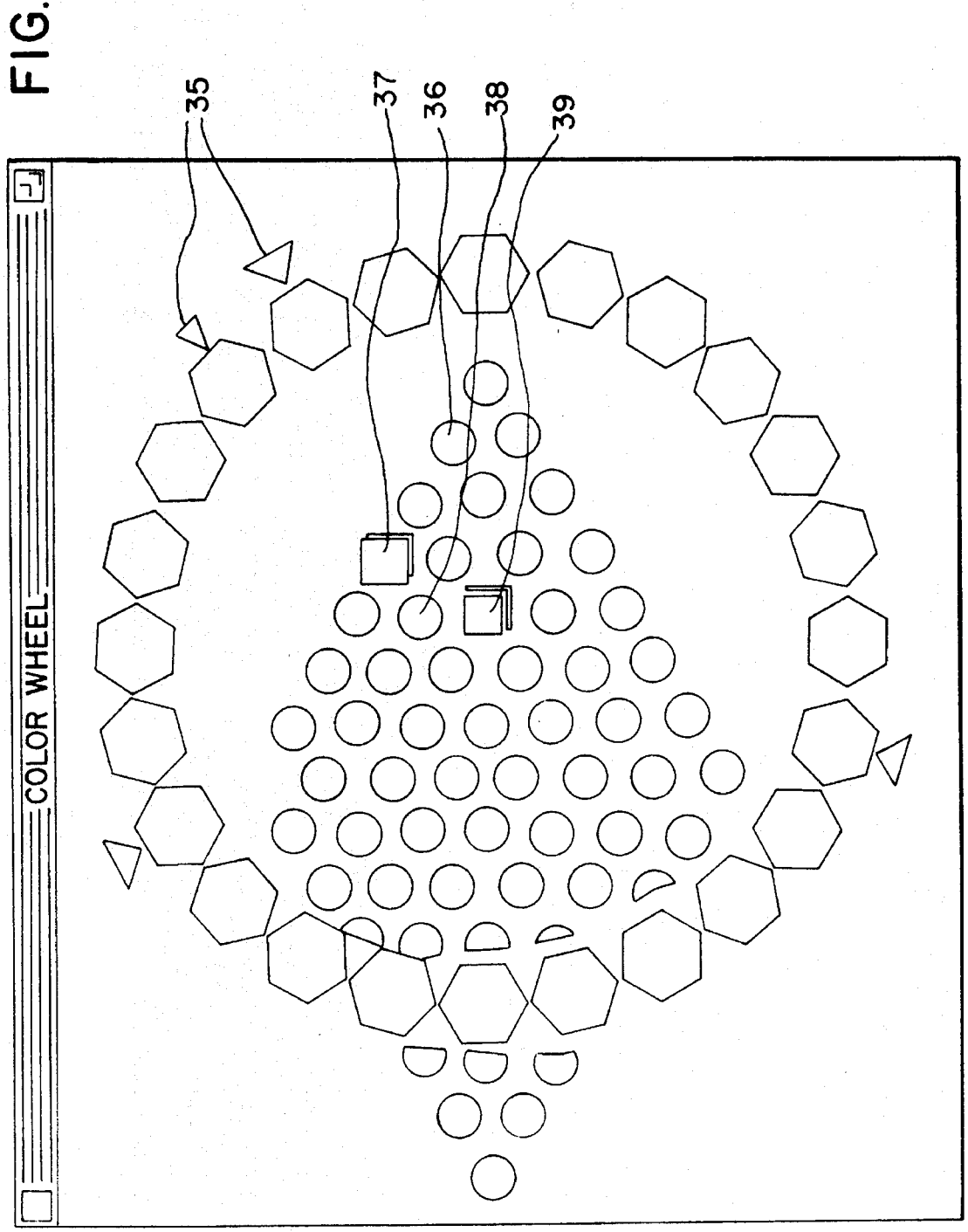

INTERACTIVE COLOR HARMONIZING METHODS AND SYSTEMS

This application is a continuation of application Ser. No. 08/059,068, filed May 10, 1993, now abandoned.

TECHNICAL BACKGROUND

This invention relates to interactive color harmonizing and more particularly it relates to methods and electronic data processing systems for presenting colors systematically for interactive viewing and color selection.

BACKGROUND ART

There is a need by students, artists, decorators and graphic designers, for example, to understand, select, match, balance colors and to harmonize colors in their work or study products. For example, if an artist has a painting that someone wants to order with a specific color match preference, the artist would be required to redo the whole painting with different colors harmonized to replace at least some of the original colors to maintain artistic integrity. For the artist to repaint using artistic talent alone would require a significant amount of time and expense to develop a coordinated painting. Similarly, if a decorator has a customer that wants to order a coordinated color scheme that coordinates with a given color matching drapery, or the like, significant artistic talent, time and effort may be required to derive a coordinated color scheme.

If a person wants to exactly find, define and reproduce a selected color of paint or dye, there is no acceptable standardization system for selecting, viewing and coordinating colors over a substantially universal range of reproducibility.

It is therefore an objective of this invention to provide an automated system for systematically finding, displaying, comparing and coordinating a substantially universal range of colors for interactive relationship with a wide range of artists, decorators and shoppers.

Many systems of color sensing, color comparison and color standardization are well known in the art as exemplified by the following U.S. patents:

Method of Measuring Color Difference of Dyestuffs, M. Suzuka, et al., U.S. Pat. No. 4,613,947, Sep. 23, 1986;

Color Signature Sensor, C. T. Sullivan, U.S. Pat. No. 4,954,972, Sep. 4, 1990;

Apparatus and Process for Color-Identification, K. Mollgaard, et al., U.S. Pat. No. 4,110,826, Aug. 29, 1978;

Image Standardizer Apparatus, J. K. Bowker, U.S. Pat. No. 3,836,246, Sep. 17, 1974;

Method for the Measurement of the Difference in Color Contents of Samples, H. Harjunmaa, U.S. Pat. No. 4,652,136, Mar. 24, 1987;

Computerized Color Matching, L. D. Wyman, et al., U.S. Pat. No. 4,813,000, Mar. 14, 1989; and Color Measuring Apparatus, M. Sugiyama, et al., U.S. Pat. No. 4,884,221, Nov. 28, 1989.

However, there is no known automated prior art system or method for interactively presenting and choosing a universal range of reproducibly identifiable colors having calibrated amounts of black and white content.

DISCLOSURE OF THE INVENTION

A basic theory of color has been developed by Wilhelm Ostwald in the early twentieth century. He established related standardized sets of definable colors to explain a wide range of color reactions as seen by the human eye. He thus selected a standard set of paints from which could be reproduced definable standardized colors. To show a substantially universal range of colors, he developed charts relating pure hues with achromatic black and white levels for producing different visible colors perceptible to the human eye. Using four basic hues (red, yellow, blue and seagreen) and four additional principle hues (orange, purple, turquoise and leaf green) he developed a circular presentation of hues equally dispersed about the visible color spectrum arranged so that visual complement pairs (which produced achromatic grays when mixed by color wheels) were diametrically opposite. To these he added some intermediate colors for a comprehensive set of twenty-four colors from which he could reproduce a full complement of colors visible to the human eye from which paintings could be pleasantly and realistically related to colors in nature as observed by the human eye.

To display the visual effects of differences in color shades, he suggested a triangular array of colors starting from a chosen hue that when mixed with chosen percentages of white or black would produce a comprehensive range of colors using that hue.

He then suggested that there is harmony in colors that produce a pleasant effect to the eye, and suggested an order for maintaining harmonious relationships. The first order of harmony lies in the pair of hues diametrically arranged in his circle of hues, which merge into gray. Then he theorized that the most striking harmonies are found by choosing hues separated by 3, 4, 6, 8 or 12 steps on this circle of hues. All these are divisible into the 24 hues of the circle for presenting sets of two to eight harmonized hues. This harmony remains present through various contrast levels of black or white content. Accordingly he developed a three dimensional model with his hues located about the circle and saturations extending along the axis conically toward white and black apices. Thus he respectively encompassed a universal range of color as seen by the eye.

The background Ostwald model has been recognized as a sound theory of color representation, and the present invention adopts that general theory in the derivation of a system for presenting, selecting and harmonizing a substantially universal range of colors in an electronic data processing system automating the selection and coordination of colors.

Thus, in accordance with the method provided by this invention, a standard set of reproducible hues is established and organized with different percentages of black and white for display of and selection of colors over a very wide range. In a preferred embodiment a standard set of 24 hues is arranged in a visual display about a wheel array with diametrically opposed complementary colors that mix to produce a shade of gray and with the 24 hues spanning the visible color spectrum in substantially equal increments. This permits interactive selection of any one of the standard hues and selection of sets of harmonized hues about the wheel.

Since saturation is a significant feature of color, there is an auxiliary visible display, preferentially in triangular format for each hue selected from the wheel arranging a set of spaced samples illustrating different standardized combinations of black or white with the hue thereby to present a calibrated set of colors for each hue. Then almost any universal color, which may be identified generally by saturation and hue, may be reproduced closely from the standard hue and standard saturation level ingredients to define reproducible colors.

In a preferred embodiment of the invention these displays are programmed for presentation upon the cathode ray screen of a color graphics computer equipped with programming for selecting, viewing, developing and editing color graphics presentations. Standard sets of colors are adjusted to the color characteristics of the screen phosphors and/or output printer color characteristics. Some basic color manipulation systems are now well known in the art and could include for example: "Color Sense Color Manager" software from Kodak, A "Macintosh Quadra 950" color computer with "QuarkXPress" or "Fractal Design Painter 2.0" software. The auxiliary program for producing the displays and functions disclosed by this invention is now commercially available as "ColorSmith" software from ElanTek Development Inc., 4401 Capitola Rd. Suite 3, Capitola Calif. 95010.

The methods and systems provided by this invention function to produce visual color representations, such as charts and pictures on computer screens and output color printers. These pictures are storable in the computer systems for recall, editing and interactive selection and manipulation of color characteristics in accordance with the Ostwald theory. By means of a color scanner, external artwork may be entered for storage, manipulation and visual presentation with modified color arrangements interactively adjusted to revised color characteristics for display by the computer and printer in use.

Also the methods and systems encompass the recolorization of color artwork originated by an artist from a graphic input device such as a tablet and mouse to suit the needs of particular clients or for editorial fashioning for more realistic or harmonized sets of colors. Samples of any given color can be taken to reorganize that color in accordance with an interactively selected color scheme.

This invention therefore permits computers to interactively display and manipulate colors which relate black and white content to various hues, whereas former systems were restricted to processing of hues thereby being incapable of processing a virtually universal range of colors.

Other objects, features and advantages of the invention will be found in the more detailed description of the invention that follows, as well as in the accompanying drawings and claims.

BRIEF DESCRIPTION OF THE DRAWINGS

Like reference characters relate to similar features to facilitate comparison throughout the several views of the drawing, wherein:

FIGS. 1d, 1e and 1f are respectively coarse, fine and theoretical graphic displays for illustrating the operational theory of the present invention;

FIGS. 3a and 3b are respectively a color standard monochromatic representation of a computer screen color standard display of the nature provided by this invention, and an enlarged and annotated section of the display of FIG. 3a;

PREFERRED EMBODIMENTS OF THE INVENTION

Figures 1A, 1B:
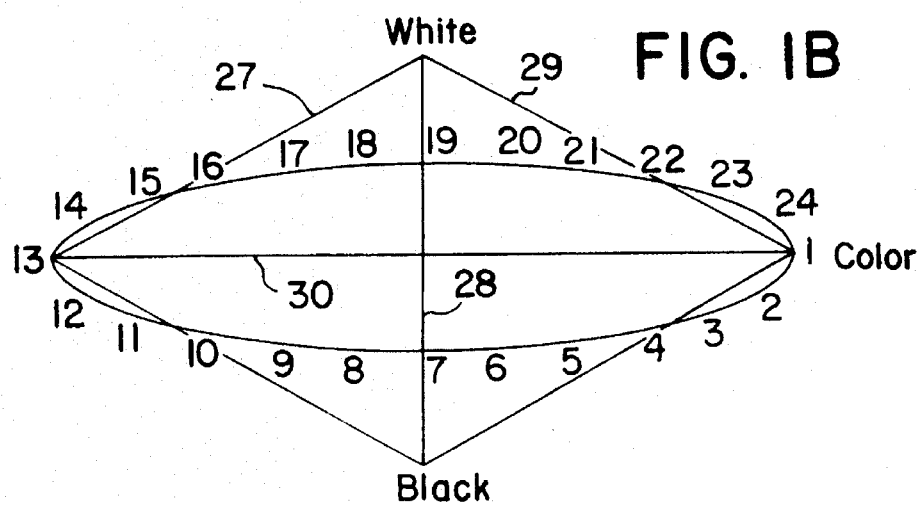
FIGS. 1a, 1b, and 1c are respectively a chart relating Ostwald notation to the legend of FIG. 1c, a schematic representation of the Ostwald color theory relationships of hue and saturation, and a schematic representation of a range of color samples for a particular hue showing the effect of saturation, as used in accordance with the invention.
Figure 1C:
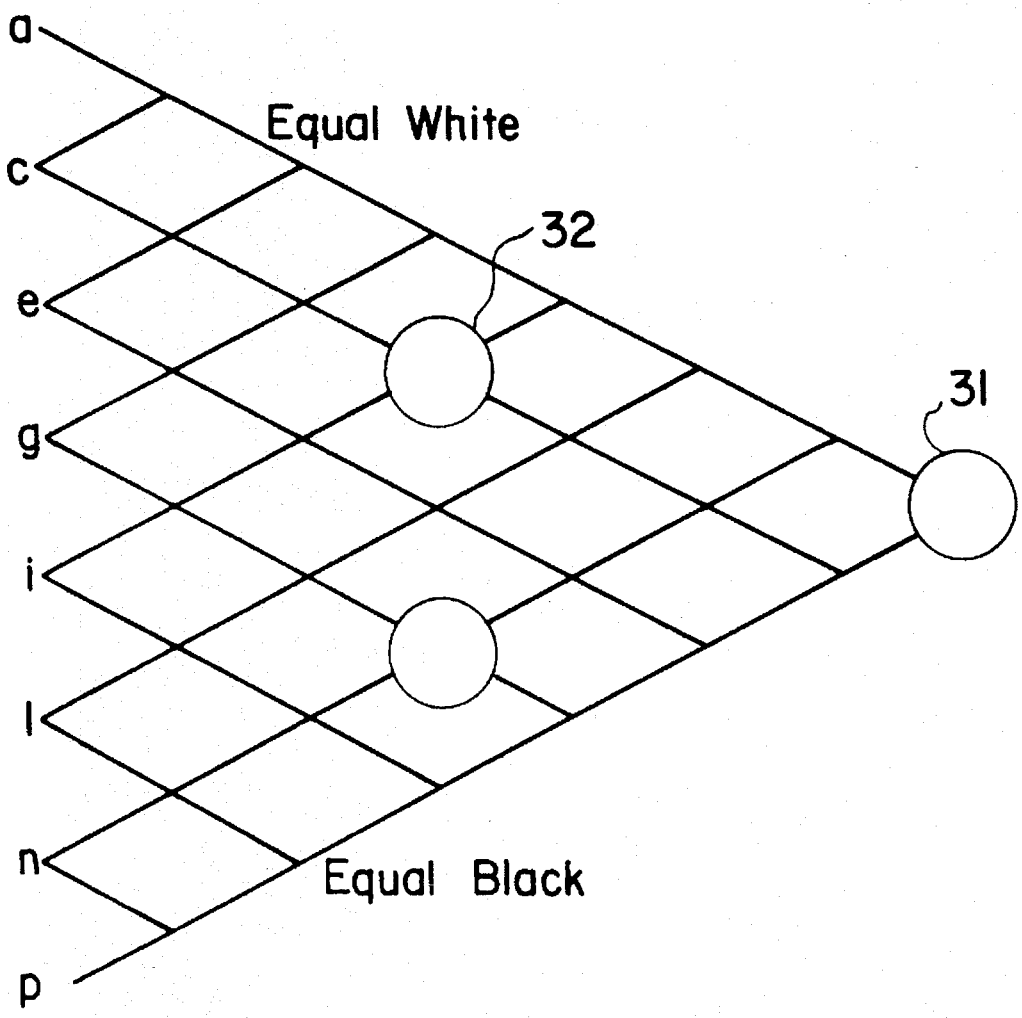

The method of and systems for viewing, selecting, and processing color presentations in accordance with this invention are related to the color principles set forth diagrammatically for black and white content shown in FIGS. 1b through 1f, as related to representative background Ostwald standards shown in the chart of FIG. 1a. With specific reference to FIG. 1b, the legends 1–24 relate to a set of hues that span the color spectrum visible to the human eye, as arranged in an elliptical or ring array, corresponding to the circular presentation of FIGS. 3a and 3b. The triangles 27, 29 with the common axis baseline 28 relate to a pair of complementary hues 1, 13 chosen from the color ring. Complementary hues when merged result in monochromatic gray. The upper apex signifies 100% of white mixed with the selected hues, and the lower apex 100% of black. In other terminology the triangles represent a range of saturations for the respective hues, as expressed by percentages of black and percentages of white content. The right hand triangle relates to hue 1 and the left hand triangle relates to hue 13. The amount of white or black content is denoted by reference characters a–p in FIGS. 1a and 1c.

As seen from FIG. 1a, The coordinates a-p along the common axis baseline 28 relate to different standard values for a hue (31) with different percentages of black and white (a–p) represented by equal black or equal white slanted lines. Thus FIG. 1c has coordinate intersections 32, etc. shown in the gridwork that are separate colors as seen by the eye. These constitute reproducible standards defined by hue together with black and white content. Such triangular shaped visual displays are represented also in FIGS. 1c to 1f, and 3a and 3b.

Figure 1D:
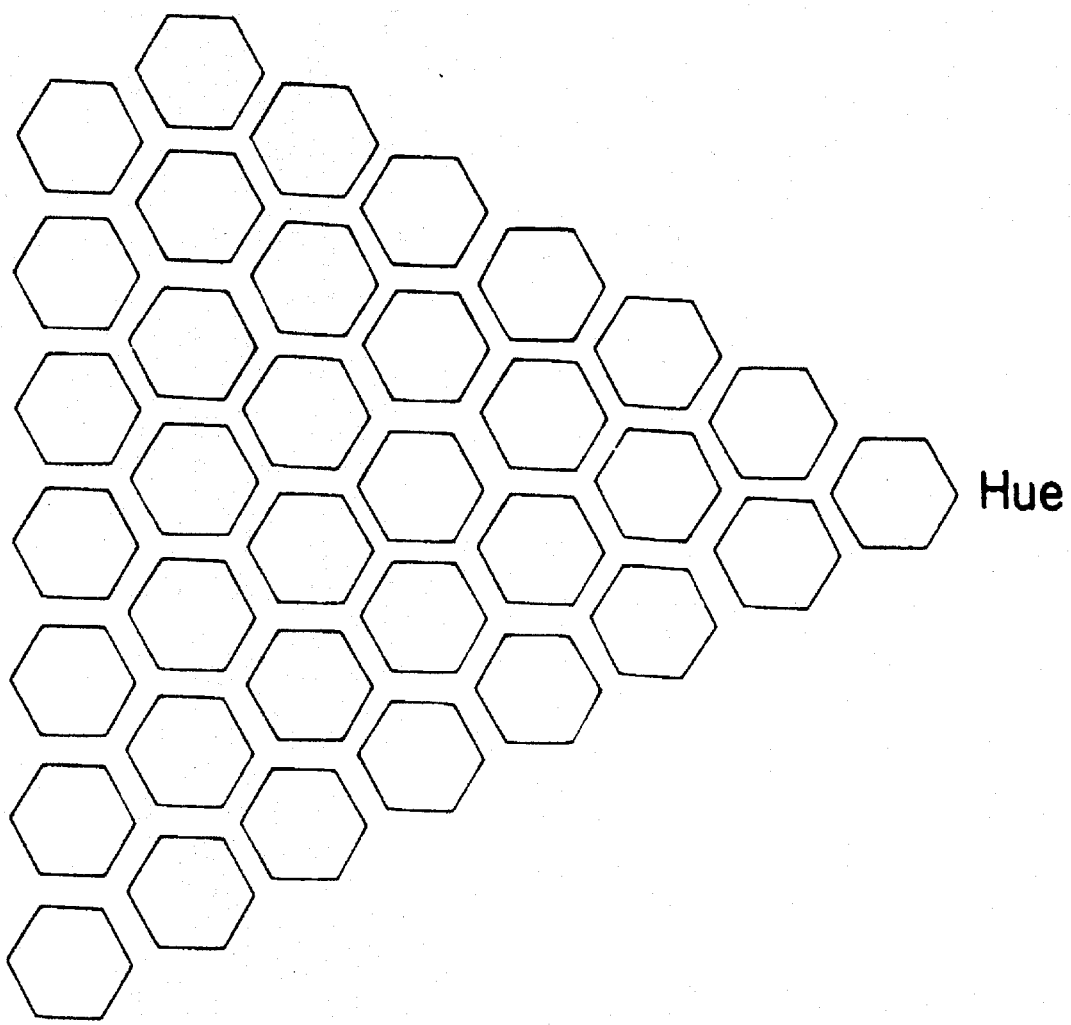

FIG. 1d is a coarse array of colors based upon a selected one of the available hues wherein the colors are represented achromatically. Thus it is seen that many colors, as seen by the eye are derived from each single hue, as defined by the white and black content. Thus the illustrated set of colors displayed in these triangles may be arranged for each of the 24 available hues to give a substantially universal color capacity, not definable on other color processing systems. The preciseness of color distinction is arbitrary as shown by FIG. 1e, where an intersection of equal black and equal white lines defines uniquely one of the myriad of possible colors.

Figure 1F:
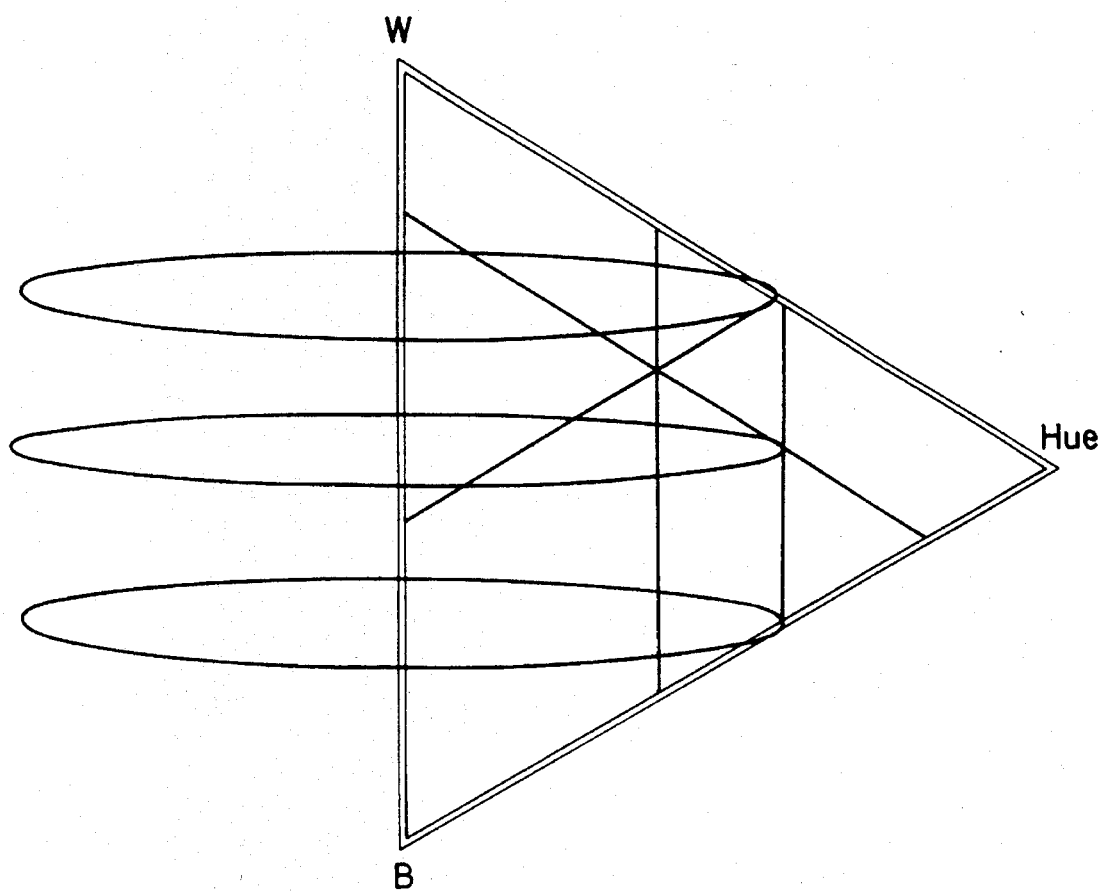

FIG. 1f is a graphical representation illustrating the ordered array of a universal range of colors in a triangular display developed on the computer screen, and the nature of the interactivity involved in selecting and defining a given color.

The hues are chosen at any one coordinate by rotating the color wheel (ellipse) to view the range of colors with defined hue and black-white content. All of the colors along the constant black-white lines harmonize but represent different colors in the range from pastels having more white to those colors with more black.

The white and black content may be regulated for viewing by saturation and brightness levels. Thus, a spectrum wide range of visible colors is attainable on a computer screen.

In this particular FIG. 1f, it is evident that different hues may be selected at different coordinates for comparison, matching, coordinating, viewing or manipulating harmonious relationships. One coordinate may be selected and replaced by another coordinate after viewing for an automatic editing procedure in the computer of replacing one color by another throughout a picture, movie or the like. Thus, a universal range of color manipulation is afforded by this invention with repeatability and definability of the color schemes, color relationships and always interactive viewing and control to assure artistic value and harmony.

Thus, a comprehensive set of reproducible color standards from which any picture may be reproduced with faithful color reproduction as it appears to the human eye is made available.

Figures 2A, 2B:
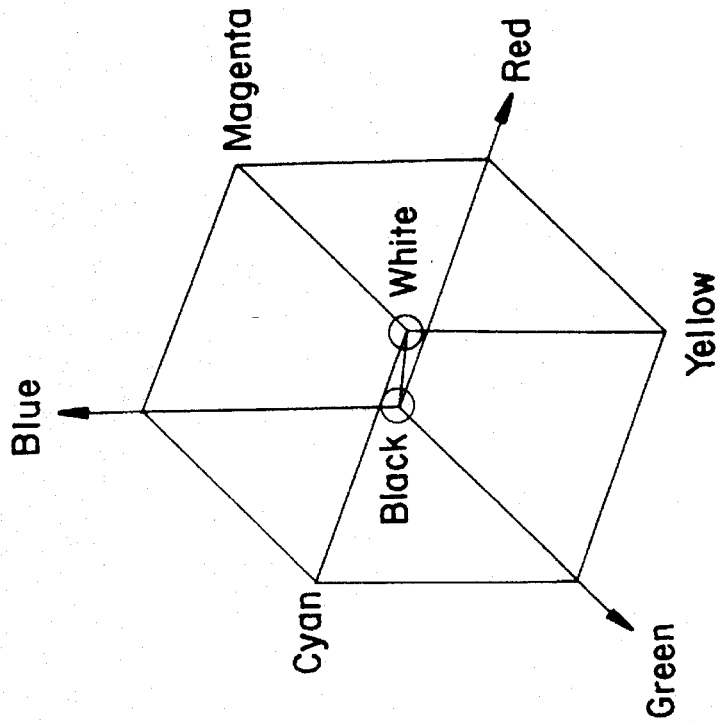
FIGS. 2a and 2b are respectively a diagrammatic representation of a range of visible hues overlaid upon a tricolor set of axes such as found on computer screen phosphors, and a hue equivalency chart relating Ostwald hue standards to those available in state of the art computer systems.

The relationship for different computer standards with the Ostwald 24 standards of the proposed embodiment are shown in FIG. 2b. There it is shown that the Ostwald standard colors 14 are convertible to the color standard terminology available in two different computer systems. A simply programmable mathematical conversion then relates a set of standard hues to the red-green-blue hues of any particular computer screen phosphors, outlined in the coordinate system of FIG. 2a. Shown are representative intermediate colors and a neutral gray axis from black to white. The obtaining of a set of standard colors reproducible on different computer systems is readily achieved by those skilled in the art by reference to the tables of FIG. 2b, for example.

Figure 3B:
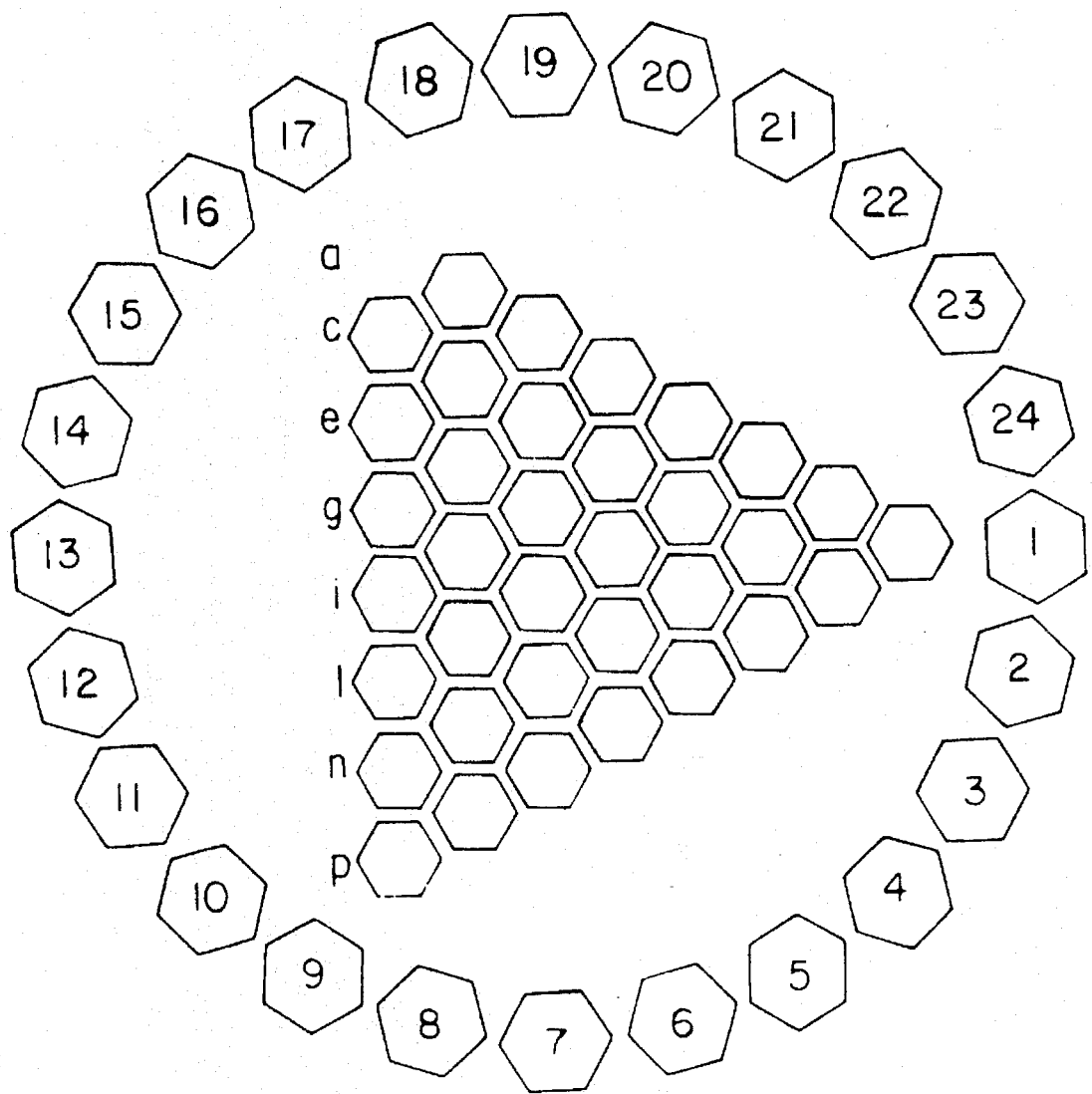

By this procedure then a standard color pattern such as that illustrated achromatically in FIGS. 3a and 3b is reproducible for reference in the Ostwald style to view, select and manipulate sets of colors in a distinctive organized display on a color computer screen. Thereby any one of the 24 hues corresponding closely to the Ostwald hue standards is definable. Accordingly by scanning any given external picture with a color scanner, the resident hues together with black and white content may be found, viewed and compared to the standard color wheel. The color wheel-triangle presentation style of FIGS. 3a and 3b thus provide a convenient vehicle for organizing color definition and manipulation with visual monitoring.

Other terminology is employed typically in FIG. 3a. Thus, identification of those hues present in any picture being processed is shown by reduced size hue samples 35 in the color ring, accentuatable in the color display by a rim of white. The computer mouse may lock in on any color sample (1–24) in the color ring and drag it through the color triangle for changing the black or white content.

Other programmed terminology is shown in the triangle. Thus, the plain circular sample 36 is a reference color not in use in the system at the time. The squares 37 show a color in use. The white rimmed or smaller circle 38 indicates a black and white coordinate that is in use in another hue. The smaller or white rimmed square 39 indicates a color in use in this hue and another hue. To indicate selected objects the white border may be formed of a moving dashed line. Thus a "color wheel" program subroutine can produce a visual representation in the form shown in FIG. 3a for visually showing in color all the choices available together with a status report of the colors in the original color presentation and the choices made for modification of the original colors. In this way the various colors may be compared visually and kept in readiness for interactive manipulation.

Figure 4:
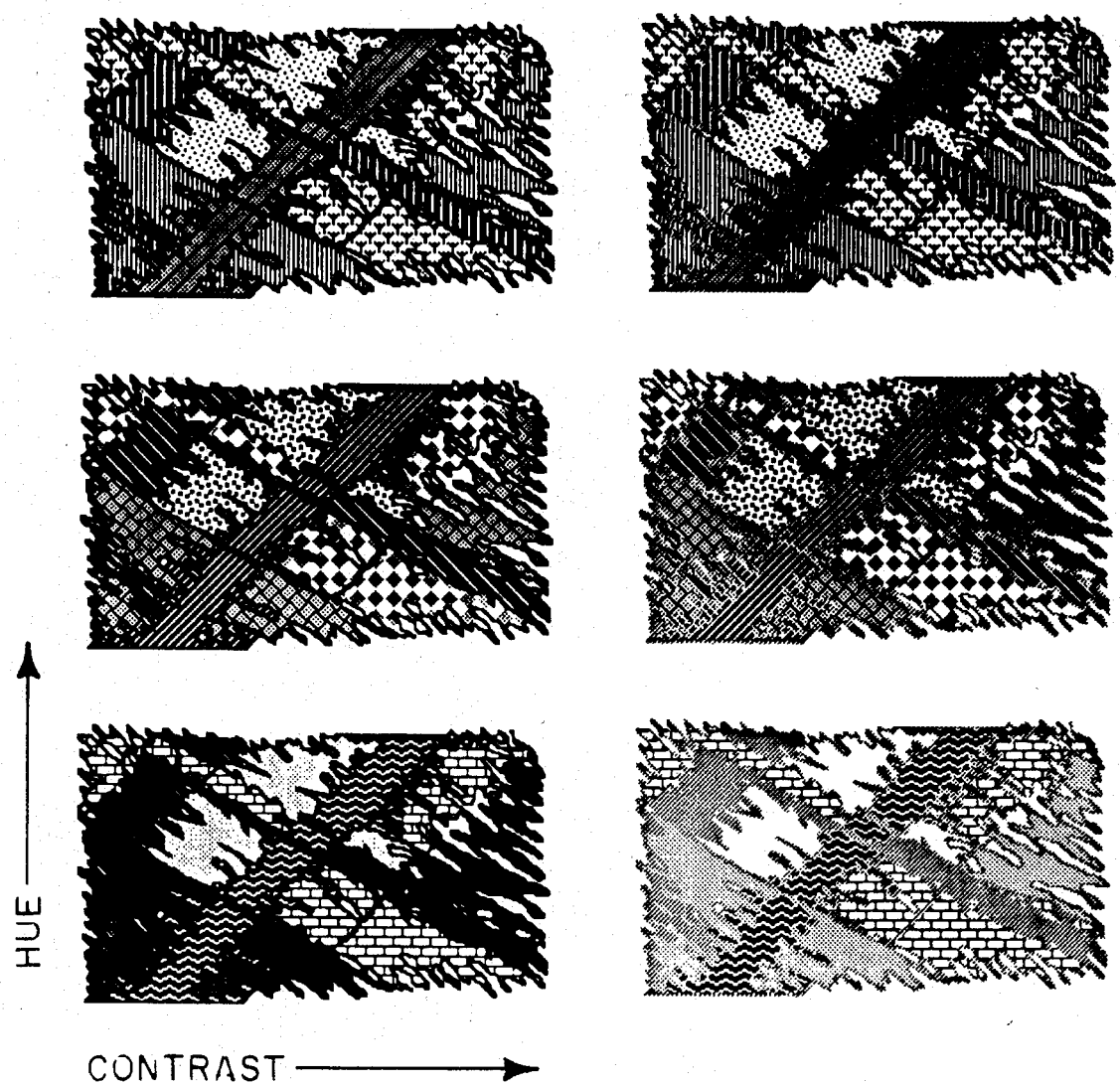
FIG. 4 is a monochrome pictorial representation of a chromatic presentation to illustrate changes of hue and contrast perceived by the human eye.

Note that the term color is more generally used herein to define a specified hue combined together with definable black and white content. The effects of changes of either hue or black and white coordinates are illustrated in the monochrome depiction of a color presentation varying in both hue and contrast or saturation, as for example shown in FIG. 4.

A further program subroutine provides for sensing colors in an initial presentation by means of either an external color scanner or internally programmed scanning procedures, for example in response to a cursor location on the viewing screen, for processing and storing color data in the computer memory bank.

The reconstituted color presentation may then be reassembled with the different colors arranged in harmonious relationship to the colors in the original presentation, and stored, viewed, or printed out. Because of the standard gradations of hue and black and white coordinates the process is capable of reconstruction and processing on other computers in substantially identical form, so that the new pictures may be passed from computer to computer for processing on different screens and printers, when accompanied by now available programs in the computers for standardizing selected colors and adjusting to the color characteristics of the computer screen and color printer.

By choosing the twenty four Ostwald-like color hues as standards, not only can excellent pictorial reproductions occur, but the color results conform with accepted theory which has long been employed by artists in the mixing and matching of oils and paints used in their paintings. Such procedures are familiar to and acceptable by professional artists.

Figure 5:
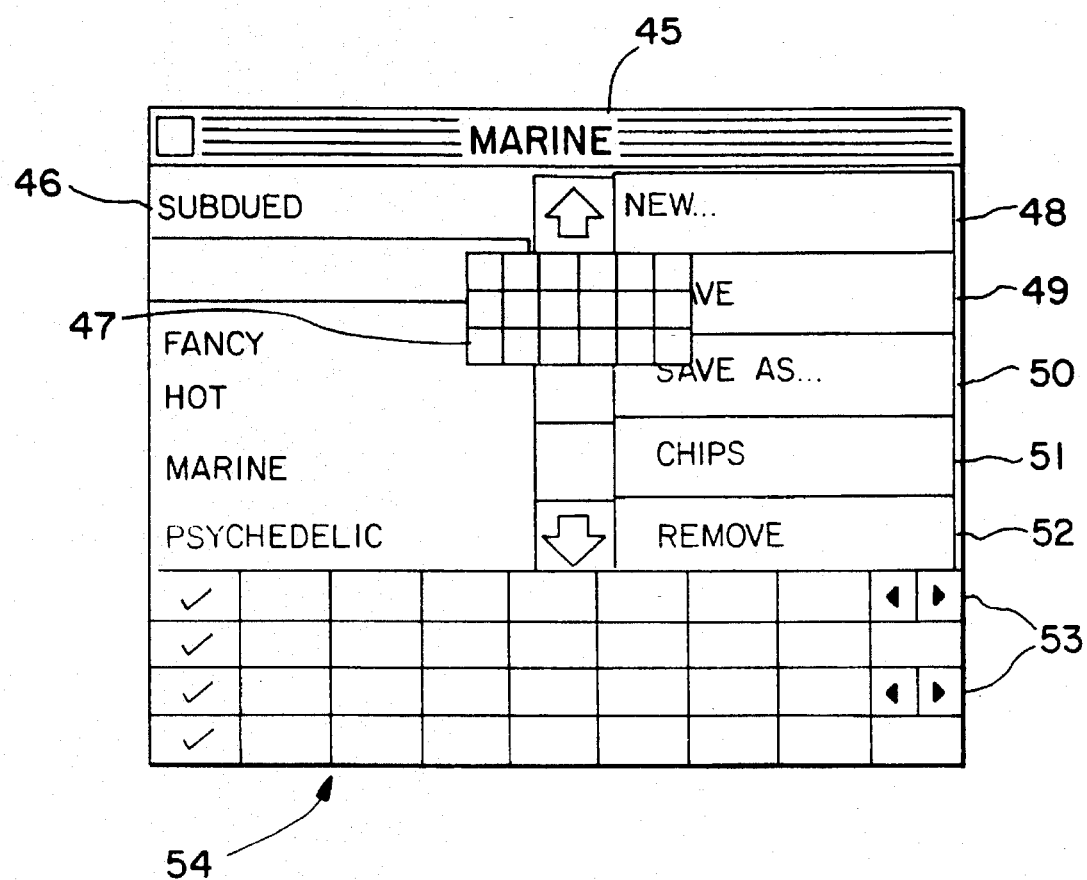
FIG. 5 is a computer command panel setting forth typical steps taken to interactively process multi-color presentations in accordance with this invention.

A typical computer control menu for palette management is shown in FIG. 5. The name of the palette in use is indicated (45) at the top border. "Subdued" 46 can bring up a list of previously saved palettes. The color samples 47 are superimposed and activated whenever the computer selects the name such as by holding down a mouse over the name 45. The routine functions of creating, saving, removing and naming palettes, or putting into the clipboard for further processing are indicated at 48–52. At 53 controls are indicated for scrolling through further color ranges than presented in blocks 54. Thus, it is seen that the color presentations or palettes can be edited and modified in the same manner as the routine handling of color objects within the capabilities of the particular color computer and programming used.

Figure 6:
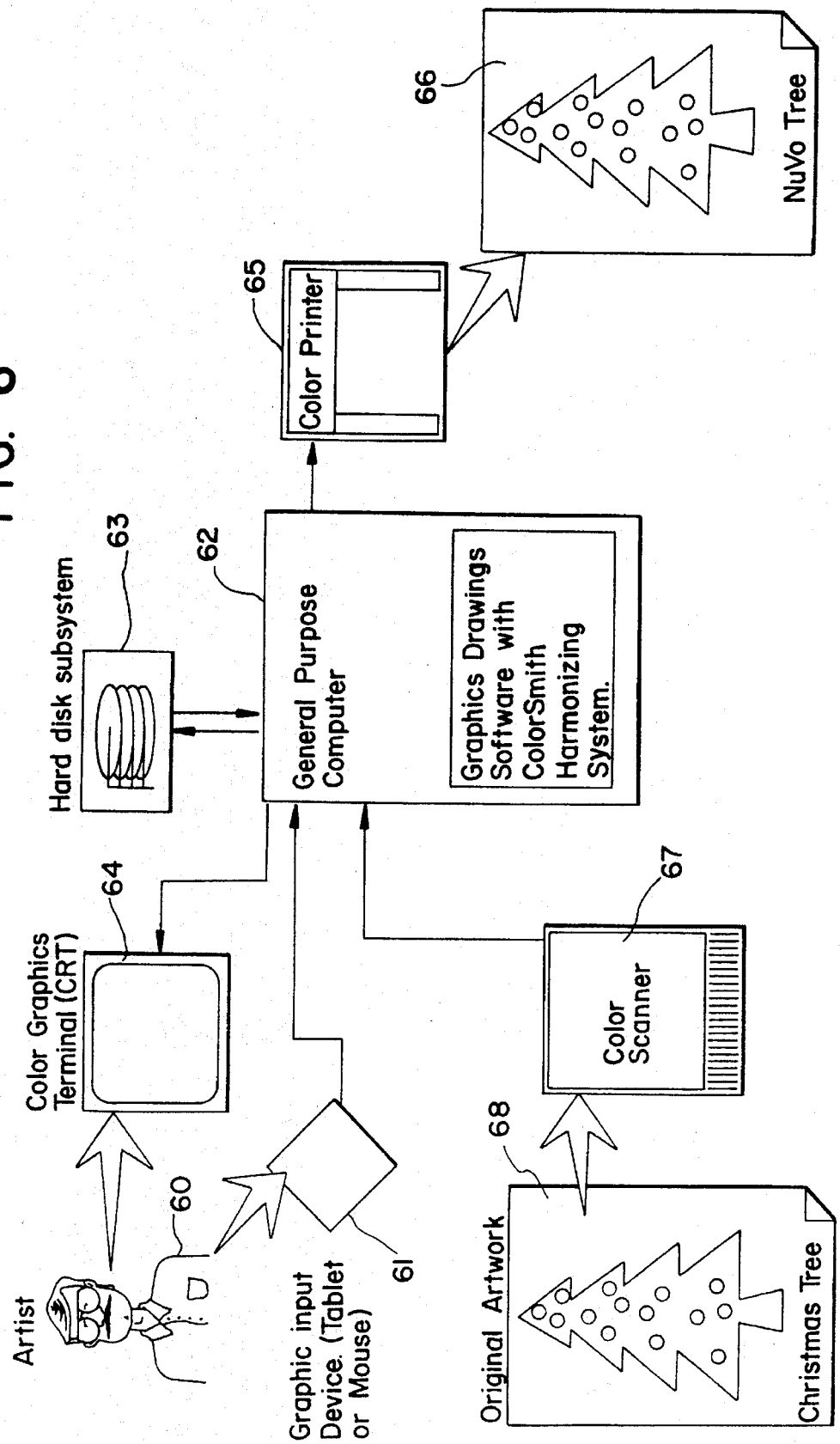
FIGS. 6 and 7 are block diagram representations of systems embodying the invention and illustrating its operation.

The general system is thus represented in FIG. 6 as a vehicle for illustrating some of the basic operational functions for processing artwork. Thus, artist 60 can prepare original artwork on the graphic input device 61 for entry into computer 62, which is appropriately equipped with graphics drawing software, and appropriately supplemented with color system software produced following the teachings of this invention. The computer has a hard disk memory subsystem 63 capable of storing and manipulating color graphics presentations, and a color graphics terminal 64 for visually displaying in color the artwork. Also color printer 65 produces output prints 66 in color.

Now assume that artist 60 creates the NuVo Tree in print 66, but does not feel that he has created a realistic color scheme and color harmony. Thus, by using color scanner 67 and some external artwork of a decorated tree 68, the colors can be compared, and colors may be selected in the manner aforedescribed to bring the colors on print 66 into harmony with a selected reference, typically the hue and black-white coordinates of the green in the original artwork tree 68. Thus a color picture of a live tree is created more pleasing and realistic to the human eye.

Figure 7:
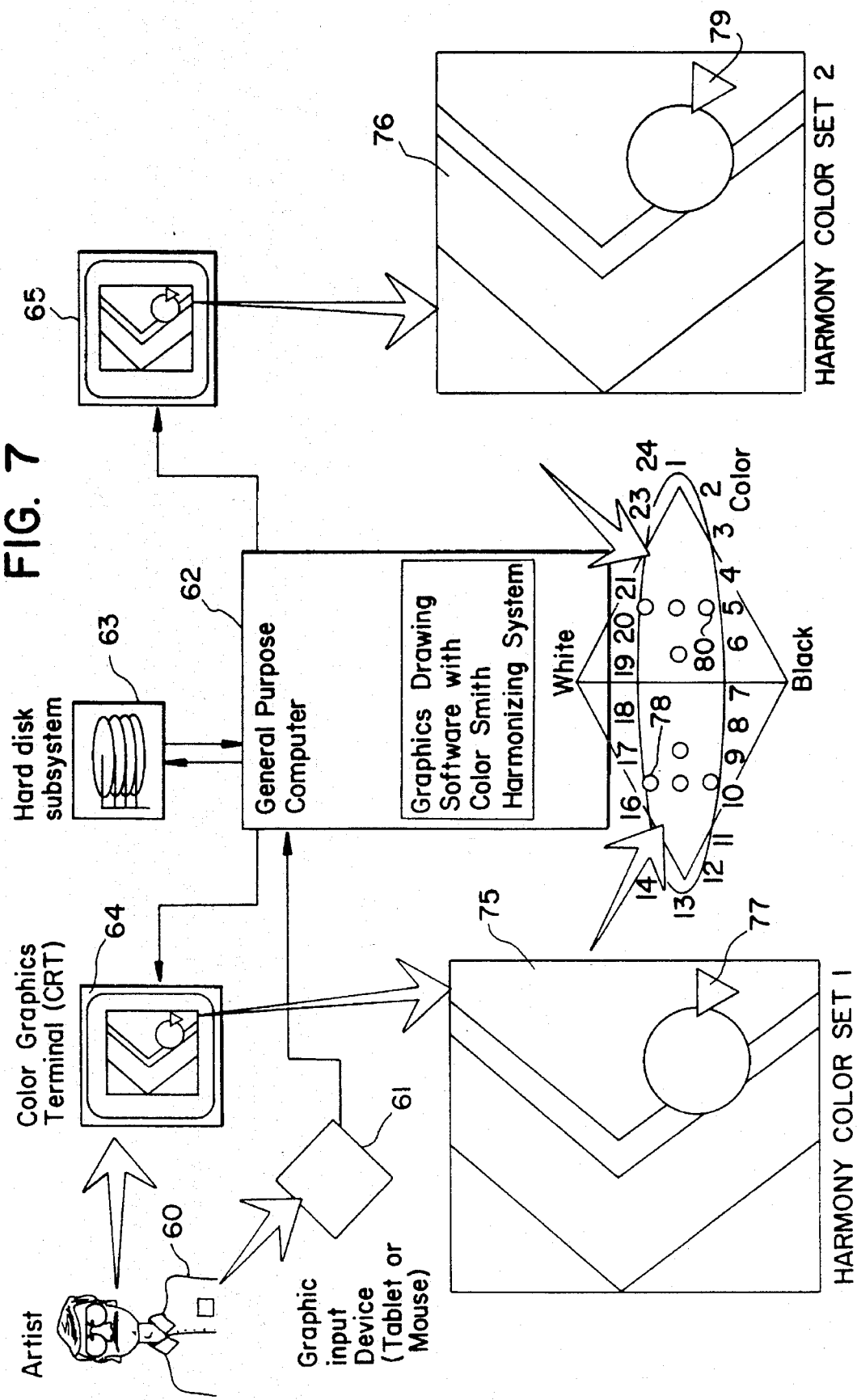

The color processing system of this invention is diagrammed in FIG. 7 to illustrate another color modification example. Thus the artist 60 initiates a typical color palette 75 for a corporate identity program with coordinated colors arranged to harmonize with the reddish color of triangle 77 as presented in the visual display as color 78. A client wants to develop that theme about a new set of colors incorporating a green triangle 79, shown as 80 within the color visual display. The new hue and black-white coordinates defining the new color 80 are selected by a cursor in the manner aforesaid, and the sample palette 75 is converted automatically by corresponding software controlled procedure into the palette 76, which pleases the customer by conforming to specific color preferences. The originally introduced color harmony blend or balance is retained in the modified colors in the new palette 76 by controlling the relationship of the related colors about the color wheel display.

It is evident therefore that this invention has introduced novel methods and systems into the art to display a substantially universal set of colors which can be interactively manipulated to control preferential color choices that include the black and white coordinate.

Accordingly those features of novelty are defined with particularity in the following claims which represent the spirit and nature of the invention and the improvements which the prior art has not heretofore provided.

We claim:

1. The method of displaying a set of colors for interactive viewing and processing in a color processing computer system, comprising the steps of:

organizing and displaying for selection therefrom a standardized set of more than three discrete hues distributed over a spectrum of visible hues perceivable by the normal human eye, selecting subsets of two or more discrete hues from said standardized set, organizing and displaying for each selected discrete hue a separate color sample set comprising for individual ones of the selected discrete hues color samples with calibrated standard amounts of both black and white content, presenting said hues and at least one said color sample set together on a computer viewing screen for observation in a viewing mode of computer system operation to visually present color choices for selection for the respective discrete hues, and processing said subsets of hues with associated color choices in said computer.

2. The method of claim 1 wherein the presenting step further comprises the presentation of said standardized set of discrete hues in a circular viewing wheel wherein the hues in said subsets of hues are each separated by a discrete number of steps about the wheel.

3. The method of claim 2 further comprising the presentation of the discrete hues in a set of twenty-four hues having a harmonious relationship between hues separated by 3, 4, 6, 8 and 12 steps about the circular wheel.

4. The method of claim 2 including the step of displaying the hues in said wheel in a color arrangement comprising diametrically opposed complementary hues that produce grey when mixed, the complementary hues each having a corresponding said color sample set.

5. The method of claim 1 further comprising the interactive step of selecting a color from a color image processed in the computer system for identification and comparison with the range of colors presented in said viewing mode.

6. The method of claim 5 with the further limiting step of replacing a set of colors including the selected color in the image with a set of different colors identified from the color sample sets presented in the viewing mode.

7. The method of claim 5 with the further limited steps of isolation of at least two hues from said standardized hues and corresponding color sample sets, and replacing a set of colors in said image with colors selected from said sample sets.

8. The method of claim 1 further comprising the interactive steps of identifying a set of hues from the standardized hues by visual observation, and replacing the identified set of hues with a set of hues in an image processed by said computer system.

9. The method of claim 1 further comprising the steps of editing c color presentation in said computer system by substituting a set of colors identified in the color presentation with colors chosen from said at least one color sample set.

10. The method of claim 1 further comprising the steps of:

arranging the hues in said presenting step in a circular viewing pattern on the viewing screen; and further arranging each hue to be selectively displayed in said color sample set as a color sample, with the color samples arranged in a triangular array.

11. A computer system for processing colors in sets of discrete colors, comprising in combination, means for establishing a set of more than three discrete standard hues substantially encompassing a complete visual color spectrum in a pattern identifying therein a plurality of subsets of hues; means for selecting processing and viewing each of the discrete hues in the set; means for establishing and displaying for each selected discrete hue a sample set of standardized colors with a range of predetermined differing black and white components; means for selecting a said subset of at least two desired hues incorporated in corresponding color samples from said sample sets of colors; and means for processing color images with said subsets of desired hues in said computer system.

12. The computer system of claim 11 further comprising, color editing means responsive to replace a selected set of colors in an image processed in said computer system with a corresponding said set of alternative said standardized colors.

13. The computer system of claim 11 further comprising means for presenting said set of standard hues in a circular array having complementary hues that merge into gray diametrically opposed in a circular array and means for arranging two said sample sets of colors in triangular arrays with the complementary hues at an apex.

14. The computer system of claim 11 further comprising means for presenting said subsets of hues and said standardized colors for simultaneous visual observation, and means for selecting different discrete ones of said hues for displaying with an accompanying said sample set of colors.

15. The computer system of claim 14 further comprising means to visually array said standard hues in a circular array and said sample set of standardized colors for selected individual hues in a triangular format with a selected hue in the circular array positioned as a color at an apex and having said range of color samples in the set being arranged in said triangular format in a plurality of parallel constant white content and parallel constant black content rows incorporating a range of color samples having standardized magnitudes of constant black and constant white constituency.

16. The computer system of claim 11 further comprising interactive means for comparing colors of a color image with the standardized colors.

17. The computer system of claim 11 further comprising means for selecting said selected discrete hues from said standard set and individual color samples from corresponding sets of said standardized color samples for a color processing procedure, and means for visually identifying on said displayed colors and hues a set of activated colors and hues selected therefrom for interactive color processing.

18. The method of editing colors in a computer programmed for color editing having a color image presented thereby comprising in combination the steps of:

displaying a standardized set of more than three hues having subsets of hues arranged therein, identifying and selecting a said subset of at least two hues from the standard set of hues for introduction into said color image, and replacing the selected hues of the subset for a different manually selected subset of hues from the color image by automated computer operation.

19. The method claim 18 further comprising the steps of:

visually displaying on a viewing screen of said computer for a selected hue a discrete set of standardized color samples, and manually selecting said modified set of hues to include one of said color samples.

20. The method of claim 19 further comprising the step of:

visually representing on said viewing screen for any one selected standardized hue a said set of color samples embodying that selected hue in a format with color samples incorporating standardized black and constant white contents.

21. The method of claim 19 further comprising the steps of:

arranging the hues and color samples together in a diamond shaped display identifying different subsets of the hue.

22. A computerized color harmonization system, comprising in combination:

a computer system for processing, viewing and editing a color image in the computer system;

means for selecting and introducing a desired hue into the computer system from a visually arranged sample set of standardized color samples comprising that selected hue having calibrated percentages of black and white content; and means for introducing a selected standardized sample in said color image to replace a selected color in the color image.

23. The computerized color system of claim 22 further comprising:

means for presenting visually for selection of a color sample a sample set of color standards related to any chosen one said selected hue concurrently therewith, means for storing for computer processing different sets of color samples, and means for replacing in a color image processed by said computerized system one of the color sample sets with a different corresponding set of colors in the color image.

* * * * *